United States Patent
Satoh et al.

(10) Patent No.: US 7,630,555 B2
(45) Date of Patent: Dec. 8, 2009

(54) POSITION AND ORIENTATION MEASURING METHOD AND APPARATUS

(75) Inventors: Kiyohide Satoh, Kawasaki (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 11/418,168

(22) Filed: May 4, 2006

(65) Prior Publication Data

US 2006/0262141 A1 Nov. 23, 2006

(30) Foreign Application Priority Data

May 11, 2005 (JP) ............................. 2005-138468

(51) Int. Cl.
*G06K 9/46* (2006.01)
(52) U.S. Cl. ..................................... 382/201
(58) Field of Classification Search ................. 382/103, 382/151, 154, 195, 201, 206, 216, 291, 295; 345/419; 348/94; 702/150–153
See application file for complete search history.

(56) References Cited

U.S. PATENT DOCUMENTS 6,765,569 B2 * 7/2004 Neumann et al. ............ 345/419
6,993,450 B2 * 1/2006 Takemoto et al. ........... 702/153
2002/0069013 A1 * 6/2002 Navab et al. ................ 701/200
2005/0069174 A1 * 3/2005 Uchiyama et al. ........... 382/103

OTHER PUBLICATIONS

K. Satoh, et al., "Robust vision-based registration utilizing bird's-eye view . . . ", Proc. 2nd International Symposium on Mixed & Augmented Reality (ISMAR'03), p. 46-55, 2003.
E. Foxlin, et al., "FlightTracker: A novel optical/inertial tracker . . . " Proc. 3rd International Symposium on Mixed and Augmented Reality (ISMAR'04), pp. 212-221, 2004.
J. Park, et al., "Vision-based pose computation: robust and accurate augmented . . . " Proc. 2nd International Workshop on Augmented Reality (IWAR'99), pp. 3-12, 1999.
D. G. Lowe, "Fitting parameterized three-dimensional models to images," IEEE Transactions on PAMI, vol. 13, No. 5, pp. 441-450, 1991.

* cited by examiner

*Primary Examiner*—Daniel G Mariam
(74) *Attorney, Agent, or Firm*—Canon U.S.A. Inc., I.P. Division

(57) ABSTRACT

A position and orientation measuring apparatus includes an inside-out index detecting section that can obtain an image from an imaging apparatus and detect an index provided on a measuring object body, an outside-in index detecting section that can observe and detect indices provided on the imaging apparatus and on the measuring object body based on an image obtained from an outside-in camera provided in an environment, and a position and orientation calculating section that can calculate positions and orientations of the imaging apparatus and the measuring object body based on information relating to image coordinates of the detected indices.

12 Claims, 6 Drawing Sheets

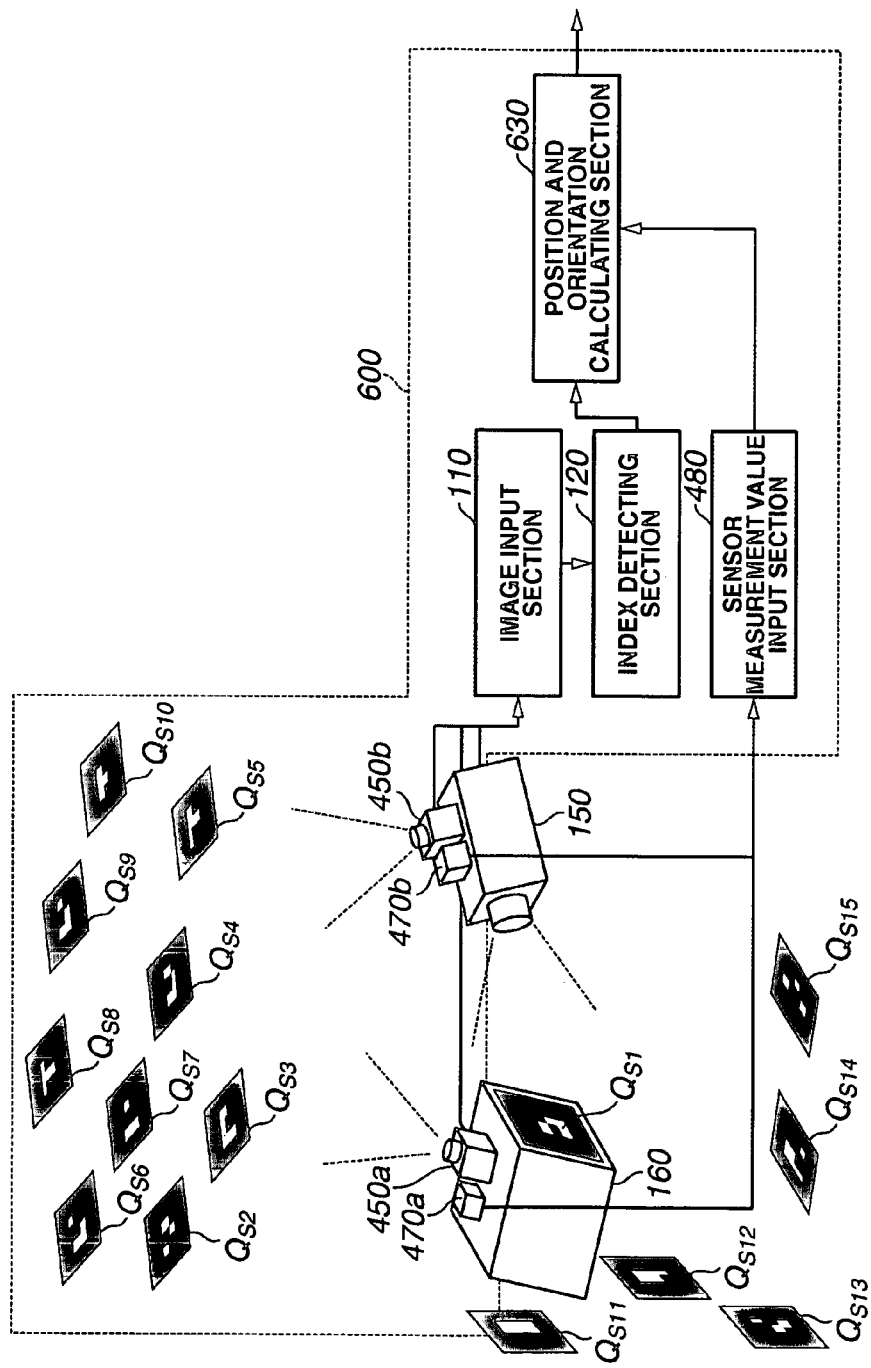

POSITION AND ORIENTATION MEASURING METHOD AND APPARATUS

BACKGROUND OF THE INVENTION

1. Field of the Invention

The present invention relates to a technique for measuring the position and orientation of an object body.

2. Description of the Related Art

The technique relating to mixed reality can realize a seamless combination of a physical space and a virtual space. For example, to realize an intended mixed reality, an image display apparatus inputs an image of the physical space from a video camera and combines the obtained physical space image with a virtual space image (for example, including virtual object bodies and character information created according to the computer graphics) which can be produced with reference to the position and the orientation of the camera.

Such a mixed reality can be realized only when a relative position and a relative orientation between a base coordinate system and a camera coordinate system are accurately measurable. The base coordinate system is defined in the physical space as a standard coordinate system which can determine the position and the orientation of virtual object bodies to be combined.

More specifically, when a virtual object body (i.e., a virtual space image) is drawn at a predetermined position in the physical space, an image of this virtual object body must be created with camera parameters identical with the camera parameters conforming to the base coordinate system. For example, when a virtual object body is placed at a predetermined position (e.g., in a room or on a table) in the physical space, the base coordinate system can be defined at an appropriate place (e.g., on a floor or on a table) in the physical space. The position and the orientation of a camera can be obtained in the base coordinate system.

Furthermore, the mixed reality technique can combine any information on a real object body that is movable. For example, a virtual pattern or a label can be combined on a real box held by an observer. If the object body coordinate system of a combined object body (i.e., the box) is a base coordinate system, the position and the orientation of a camera can be obtained in the base coordinate system (i.e., in the object body coordinate system of the box).

To realize such a measurement, there is one method (referred to as a "first approach"). First, plural indices (e.g., markers or natural features) can be disposed or set on the surface of a box (i.e., an object body to be combined). Then, the coordinates of each projected index can be detected on an image obtained from a camera. Then, the position and the orientation of the box relative to the camera can be obtained based on the position of each detected index in the object body coordinate system.

There is another method (referred to as a "second approach"). First, a base coordinate system can be defined in the physical space. Then, positions and orientations of the camera and the box (i.e., an object body to be combined) can be obtained in the base coordinate system. Then, a relative position and a relative orientation between the camera and the box can be obtained based on their position and orientation data obtained in the common coordinate system. For example, an outside-in camera can be additionally provided in the physical space to obtain an image of the measuring objects (i.e., the camera and the box).

The coordinates of plural indices disposed or set on the camera and the box can be detected from the image obtained by the outside-in camera. Then, based on a relationship between the projected image of indices on the camera and the indices in the camera coordinate system, a position and an orientation of the camera in the base coordinate system can be calculated. Furthermore, based on a relationship between the projected image of an index on the object body and the index position in the object body coordinate system, a position and an orientation of the box can be calculated in the base coordinate system. Then, a position and an orientation of the box relative to the camera can be measured based on the position and orientation data of the camera and the box in the base coordinate system.

Furthermore, the second approach can be realized by applying a conventional method (such as a method for measuring the position and the orientation of a measuring object body in the base coordinate system) to measure positions and orientations of respective measuring object bodies. For example, plural indices can be disposed at known positions in the physical space, and image coordinates of respective indices can be detected from an image taken by a camera (i.e., a measuring object). The position and the orientation of the camera (i.e., the measuring object) in the base coordinate system can be obtained based on the detected image coordinates. Similarly, an inside-out camera can be mounted on an object body to be combined (i.e., a measuring object body). The position and the orientation of the object body in the base coordinate system can be obtained based on the indices imaged and detected by the inside-out camera.

Furthermore, a camera serving as a measuring object body (or an inside-out camera mounted on a measuring object body) can obtain the information relating to indices in a physical space, and an outside-in camera placed in a physical space can obtain the information relating to indices on the measuring object body. The information obtained by the measuring object camera (or the inside-out camera) and the information obtained by the outside-in camera can be used to obtain the position and orientation of the measuring object body in the base coordinate system (for example, refer to K. Satoh, S. Uchiyama, H. Yamamoto, and H. Tamura: "Robust vision-based registration utilizing bird's-eye view with user's view," Proc. 2nd International Symposium on Mixed and Augmented Reality (ISMAR'03), pp. 46-55, 2003, and E. Foxlin, Y. Altshuler, L. Naimarkand M. Harrington: "Flight-Tracker: A novel optical/inertial tracker for cockpit enhanced vision," Proc. 3rd International Symposium on Mixed and Augmented Reality (ISMAR '04), pp. 212-221, 2004).

However, according to the first approach, the index (indices) on a box (i.e., an object body to be combined) must be constantly and sufficiently observed by a camera (i.e., a measuring object). Therefore, if the surface of a box is covered with a hand of the observer, combining the information will be difficult. Furthermore, according to the first approach, positions and orientations of respective measuring object bodies in the base coordinate system cannot be obtained. The first approach cannot be used to display the measuring object bodies simultaneously with virtual information fixed in the base coordinate system.

Furthermore, according to the second approach, the information relating to an object body to be combined cannot be used in the measurement, even if such information can be obtained by a camera (i.e., a measuring object). Errors in the measurement of positions and orientations of the camera and a box (i.e., an object body to be combined) will appear as positional deviations of virtual object bodies on a combined image.

SUMMARY OF THE INVENTION

The present invention is directed to realization of stability and improvement of accuracy in the measurement of the position and the orientation of a target object.

According to an aspect of the present invention, there is provided a position and orientation measuring method for measuring a position and an orientation of a first imaging apparatus and a position and an orientation of at least one object body observed by the first imaging apparatus. The position and orientation measuring method includes: (a) detecting an index provided on the observed object body, based on a first image obtained from the first imaging apparatus; (b) detecting an index provided on the observed object body, based on a second image obtained from a second imaging apparatus provided in an environment; (c) detecting an index provided on the first imaging apparatus, based on the second image; and (d) calculating a position and an orientation of the first imaging apparatus and a position and an orientation of the observed object body, based on information relating to image coordinates of the indices detected in (a), (b) and (c).

According to another aspect of the present invention, there is provided a position and orientation measuring method for measuring a position and an orientation of a first imaging apparatus and a position and an orientation of at least one object body observed by the first imaging apparatus. The position and orientation measuring method includes: (a) detecting an index provided on the observed object body, based on a first image obtained from the first imaging apparatus; (b) detecting an index provided in an environment, based on a second image obtained from a second imaging apparatus mounted on the observed object body; (c) detecting an index provided in the environment, based on the first image or from a third image obtained from a third imaging apparatus mounted on the first imaging apparatus; and (d) calculating a position and an orientation of the first imaging apparatus and a position and an orientation of the observed object body, based on information relating to image coordinates of the indices detected in (a), (b) and (c).

According to another aspect of the present invention, there is provided a position and orientation measuring method for measuring positions and orientations of plural measuring object bodies or measuring a relative position and a relative orientation between the measuring object bodies. The position and orientation measuring method includes: (a) observing and detecting indices provided on other measuring object bodies, based on an image obtained from a first imaging apparatus mounted on at least one of the measuring object bodies; (b) observing and detecting indices provided on respective measuring object bodies, based on an image obtained from a second imaging apparatus provided in an environment; and (c) calculating positions and orientations of respective measuring object bodies or calculating a relative position and a relative orientation between the measuring object bodies, based on information relating to image coordinates of the indices detected in (a) and (b).

According to an aspect of the present invention, there is provided a position and orientation measuring method for measuring positions and orientations of plural measuring object bodies or measuring a relative position and a relative orientation between the measuring object bodies. The position and orientation measuring method includes: (a) detecting indices provided in other measuring object bodies, based on an image obtained from a first imaging apparatus mounted on at least one of the measuring object bodies; (b) observing and detecting indices provided in an environment, based on an image obtained from a second imaging apparatus provided on each of the measuring object bodies; and (c) calculating positions and orientations of respective measuring object bodies or calculating a relative position and a relative orientation between the measuring object bodies, based on information relating to image coordinates of the indices detected (a) and (b).

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram showing the arrangement of a position and orientation measuring apparatus in accordance with a third exemplary embodiment.

DETAILED DESCRIPTION OF THE EMBODIMENTS

Figure 1:
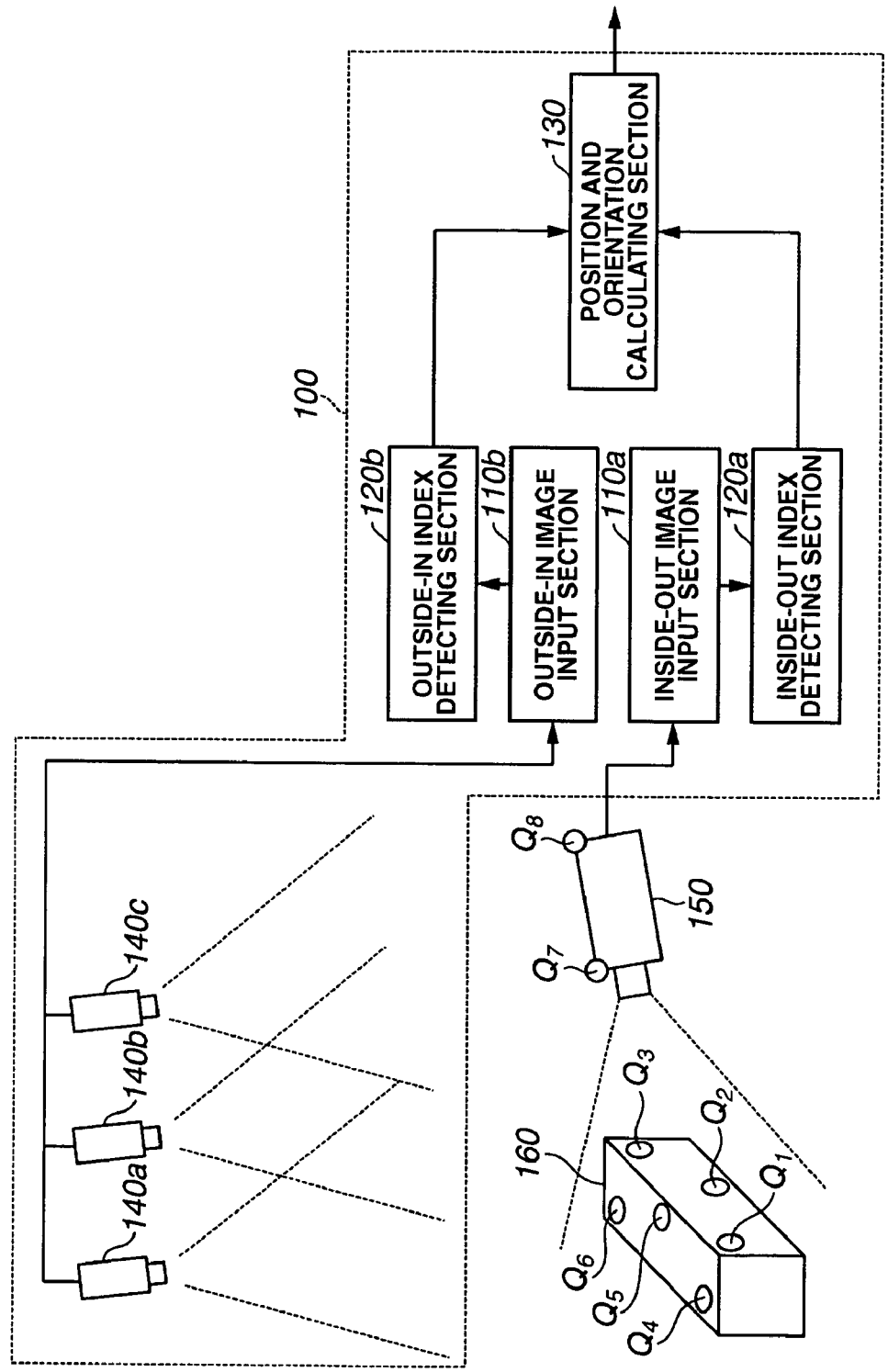
FIG. 1 is a diagram showing the arrangement of a position and orientation measuring apparatus in accordance with a first exemplary embodiment.

The following description of exemplary embodiment(s) is/are merely illustrative in nature and is in no way intended to limit the invention, its application, or uses.

Processes, techniques, apparatuses, and materials as known by one of ordinary skill in the art may not be discussed in detail but are intended to be part of the enabling description where appropriate. For example, certain circuitry for inputting, detecting, processing, calculating and others may not be discussed in detail. However these systems and the methods to fabricate these system as known by one of ordinary skill in the relevant art is intended to be part of the enabling disclosure herein where appropriate.

Note that similar reference numerals and letters refer to similar items in the following figures, and thus once an item is described with reference to one figure, it may not be discussed for following figures.

Exemplary embodiments will be described in detail below with reference to the drawings.

First Exemplary Embodiment

A position and orientation measuring apparatus according to a first exemplary embodiment can measure positions and orientations of an imaging apparatus and a measuring object body. The position and orientation measuring apparatus and a position and orientation measuring method according to the first exemplary embodiment will be described below in more detail.

FIG. 1 shows the arrangement of a position and orientation measuring apparatus 100 in accordance with the first exemplary embodiment. As shown in FIG. 1, the position and orientation measuring apparatus 100 includes an image input section 110 (an inside-out image input section 110a and an outside-in image input section 110b), an index detecting section 120 (an inside-out index detecting section 120a and an outside-in index detecting section 120b), a position and orientation calculating section 130, and an outside-in camera 140 (cameras 140a, 140b, and 140c). The position and orientation measuring apparatus 100 is connected to an imaging apparatus 150. The position and orientation measuring apparatus 100 according to the present exemplary embodiment measures positions and orientations of the imaging apparatus 150 and the measuring object body 160.

As shown in FIG. 1, the measuring object body 160 has plural positions where plural indices $Q_k$ (k=1, 2, . . . and $K_O$) are disposed. The positions of respective indices $Q_k$ are defined beforehand in an object body coordinate system (i.e., a coordinate system defined on the measuring object body 160 and expressed with a "symbol O" in the following description).

According to the example shown in FIG. 1, a total of six indices $Q_1$ to $Q_6$ are disposed (i.e., $K_O$=6). Respective indices $Q_k$, for example, can be markers having different colors and the same shape (e.g., a circular shape), or can be feature points such as natural features having mutually different texture features.

Furthermore, the indices $Q_k$ can be configured into rectangular monochromatic indices each having a sufficient area, or can be configured into any other indices if the image coordinates of each index can be detected when it is projected on a photographed image and when this index can be discriminated according to an appropriate method. Furthermore, each index can be intentionally provided or can be any natural index that is not intentionally provided.

The imaging apparatus 150 is, for example, a video camera. Similar to the measuring object body 160, the imaging apparatus 150 has plural positions where plural indices $Q_{KO+k}$ (k=1, . . . and $K_C$) are disposed. The positions of respective indices $Q_{KO+k}$ are defined beforehand in an inside-out camera coordinate system (i.e., a coordinate system defined with three axes, i.e., X-axis, Y-axis, and Z-axis, perpendicular with each other and extending from an origin positioned on a viewpoint of the imaging apparatus, and expressed with a "symbol C" in the following description). According to the example shown in FIG. 1, two indices $Q_7$ and $Q_8$ are disposed on the imaging apparatus 150 (i.e., $K_C$=2). The position and orientation measuring apparatus 100 can input an image obtained by the imaging apparatus 150 (referred to as an "inside-out image" in the following description).

The outside-in camera 140 can be a single video camera or a group of video cameras (140a, 140b, and 140c). The outside-in camera 140 is fixed at a predetermined place. When the imaging apparatus 150 and the measuring object body 160 are positioned within a measuring object range, the outside-in camera 140 (i.e., at least one of cameras 140a, 140b, and 140c) can obtain images of the imaging apparatus 150 and the measuring object body 160.

The outside-in image input section 10b can input an image (referred to as an "outside-in image" in the following description) produced from the outside-in camera 140. The position and the orientation of the outside-in camera 140 are stored beforehand as known values defined in a base coordinate system (expressed with a "symbol W" in the following description). In the present exemplary embodiment, three outside-in cameras 140a, 140b, and 140c define outside-in camera coordinate systems that are expressed with symbols $B_1$, $B_2$, and $B_3$, respectively.

The image input section 110 includes the inside-out image input section 110a and the outside-in image input section 10b. When an inside-out image is entered into the position and orientation measuring apparatus 100 from the imaging apparatus 150, the inside-out image input section 110a converts the inside-out image into digital data and outputs the converted data to the inside-out index detecting section 120a.

Similarly, when an outside-in image is entered into the outside-in image input section 110b from the outside-in camera 140, the outside-in image input section 110b converts the outside-in image into digital data and outputs the converted data to the outside-in index detecting section 120b.

The index detecting section 120 (i.e., 120a and 120b) can input image data from the image input section 110 (i.e., 110a and 110b) and can detect the coordinates of respective indices (i.e., indices Q) in the obtained image. For example, when the indices are markers having different colors, the index detecting section 120 can detect regions corresponding to marker colors on the obtained image. Then, the index detecting section 120 can detect the position of a centroid of each detected region, as point coordinates representing a detected index.

When the indices are feature points having different texture features, the index detecting section 120 can apply template matching to an obtained image to detect positions of respective indices. To this end, the index detecting section 120 can store template images of respective indices beforehand as known information.

When the indices are rectangular indices, the detecting section 120 can apply binarization processing to an obtained image and then perform labeling to detect each region configured by four straight lines as an index candidate.

Then, the detecting section 120 can determine whether or not there is any specific pattern in candidate regions to exclude erroneous detection, and can obtain an identifier of the index.

The rectangular index detected in this manner corresponds to four indices placed on four corners, in this specification.

The index detecting section 120 can output the image coordinates and identifiers of detected indices to the position and orientation calculating section 130.

In the following description, serial numbers n (n=1, . . . , and N) are assigned to respective indices detected on the input images. Then, the detected indices on the images are expressed as $Q_{kn}$. N represents a total number of indices detected on each image, and can be expressed by an equation $N=\Sigma N_d$, where $N_d$ represents the number of indices detected on an image obtained by each camera and "d" represents the identifier of a camera (d=$B_1$, $B_2$, $B_3$, and C).

Furthermore, $u_n$ represents image coordinates of an index $Q_{kn}$, $d_n$ represents an identifier of a camera having imaged this index, and $u_d^{Qk}$ represents image coordinates of index $Q_k$ detected by the camera having an identifier "d" (i.e., $u_n = u_{dn}^{Qkn}$)

For example, in the example of FIG. 1, the outside-in camera 140a can observe the indices $Q_4$, $Q_5$, and $Q_6$. The outside-in camera 140c can observe the indices $Q_7$ and $Q_8$. The imaging apparatus 150 can observe the indices $Q_2$, $Q_3$, $Q_5$, and $Q_6$. Thus, the indices can be detected from the images obtained by the outside-in cameras 140a and 140c and the imaging apparatus 150. In this case, N=9, $N_{B1}$=3, $N_{B2}$=0, $N_{B3}$=2, and $N_C$=4. The index detecting section 120 outputs the identifiers of indices ($k_1$=4, $k_2$=5, $k_3$=6, $k_4$=7, $k_5$=8, $k_6$=2, $k_7$=3, $k_8$=5, and $k_9$=6), the identifiers of cameras that imaged this index ($d_1$=$B_1$, $d_2$=$B_1$, $d_3$=$B_1$, $d_4$=$B_3$, $d_5$=$B_3$, $d_6$=C, $d_7$=C, $d_8$=C, and $d_9$=C), and detected image coordinates ($u_{B1}^{Q4}$, $u_{B1}^{Q5}$, $u_{B1}^{Q6}$, $u_{B3}^{Q7}$, $u_{B3}^{Q8}$, $u_C^{Q2}$, $u_C^{Q3}$, $u_C^{Q5}$, and $u_C^{Q6}$).

The position and orientation calculating section 130 can input image coordinates of respective indices from the index detecting section 120, and can calculate and output positions and orientations of the imaging apparatus 150 and the measuring object body 160.

Each of the image input section 110, the index detecting section 120, and the position and orientation calculating section 130 shown in FIG. 1 can be implemented using a single apparatus or multiple apparatuses. Furthermore, each of the image input section 110, the index detecting section 120, and the position and orientation calculating section 130 shown in FIG. 1 can be implemented using multiple apparatuses. Furthermore, software equivalent to the image input section 110, the index detecting section 120, and the position and orientation calculating section 130 can be installed on one or plural computers. A central processing unit (CPU) of the computer can execute the software to realize the functions of these sections. In the present exemplary embodiment, respective sections (i.e., the image input section 110, the index detecting section 120, and the position and orientation calculating section 130) can be realized by the software that is installed on the same computer or on multiple computers.

Figure 2:
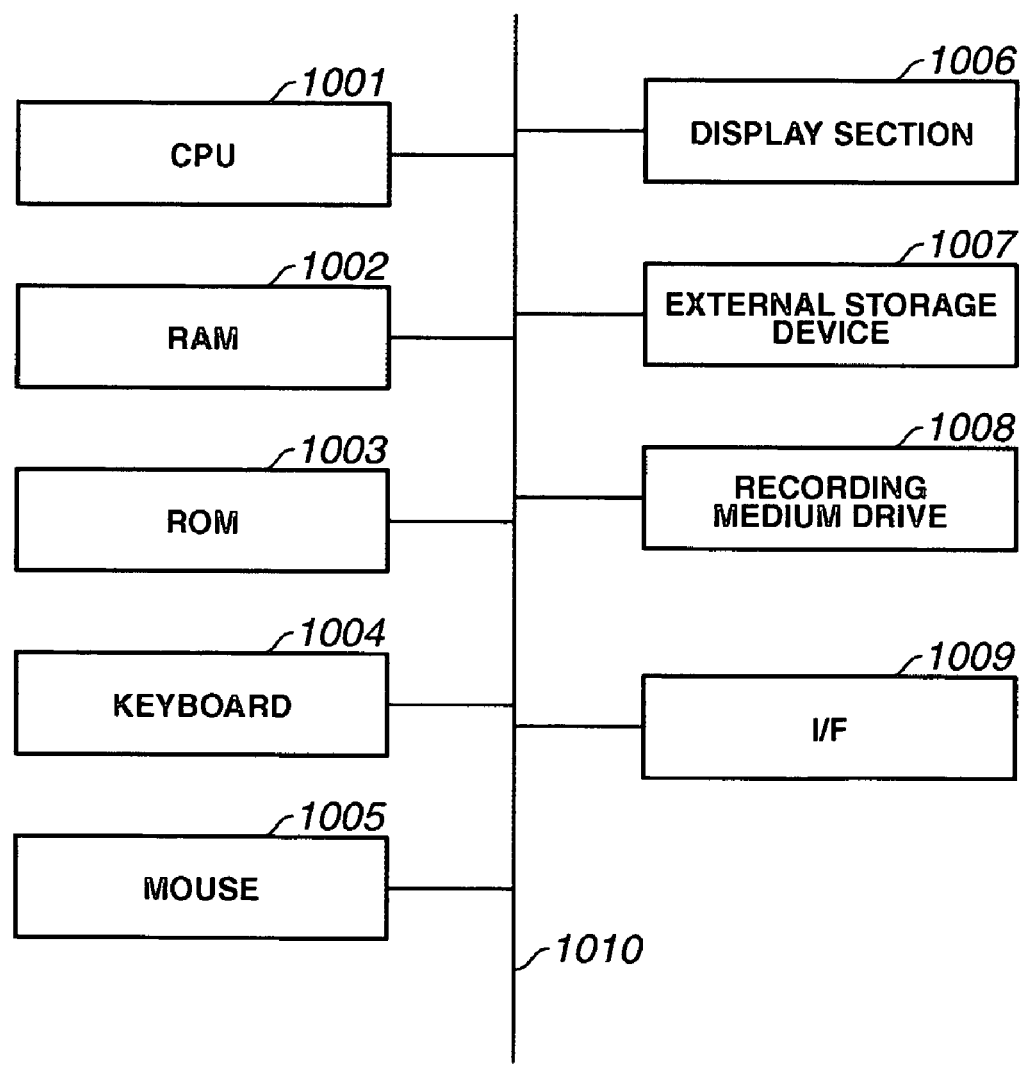
FIG. 2 is a block diagram showing a fundamental configuration of a computer that can realize functions of various sections of the position and orientation measuring apparatus shown in FIG. 1.

FIG. 2 shows a fundamental configuration of a computer that can execute the software to realize the functions of the image input section 110, the index detecting section 120, and the position and orientation calculating section 130 of the position and orientation measuring apparatus shown in FIG. 1.

The computer includes a CPU 1001, a random access memory (RAM) 1002, a read-only memory (ROM) 1003, a keyboard 1004, a mouse 1005, a display section 1006, an external storage device 1007, a recording medium drive 1008, and an interface (I/F) 1009. The CPU 1001 performs various controls of the computer based on the programs and data stored in the RAM 1002 and the ROM 1003. The computer can execute the software to realize the functions of the image input section 110, the index detecting section 120, and the position and orientation calculating section 130.

The RAM 1002 has an area for temporarily storing programs and data loaded from the external storage device 1007 or from the recording medium drive 1008, and a work area for the CPU 1001 that performs various processing.

The ROM 1003 stores computer programs and setting data. The keyboard 1004 and the mouse 1005 are input devices that allow an operator to input various instructions into the CPU 1001.

The display section 1006, constructed by, for example, a cathode ray tube (CRT) or a liquid crystal display (LCD), can display a message or the like to be displayed for the measurement of position and orientation. The external storage device 1007 is a hard disk drive or a device that can function as a large-capacity information storage device. The external storage device 1007 can store an operating system (OS) or programs that the CPU 1001 can execute. Furthermore, the external storage device 1007 can store the information (i.e., known information described in the present exemplary embodiment). The known information can be loaded, if necessary, to the RAM 1002.

The recording medium drive 1008 can read programs and data from a compact disk-ROM (CD-ROM), a digital versatile disk-ROM (DVD-ROM), or other recording medium and can output a readout program and data to the RAM 1002 or to the external storage device 1007 according to an instruction of the CPU 1001.

The interface 1009 includes an analog video port or a digital input/output port (e.g., IEEE 1394) required for connecting the imaging apparatus 150 to the computer, a serial port (e.g., RS-232C or Universal Serial Bus (USB)), and an Ethernet port via which the computer can output a calculated position and orientation to external devices. The RAM 1002 can store the data entered via the interface 1009. The interface 1009 can realize part of the function of the image input section 110.

The above-described components are mutually connected via a bus 1010.

Figure 3:
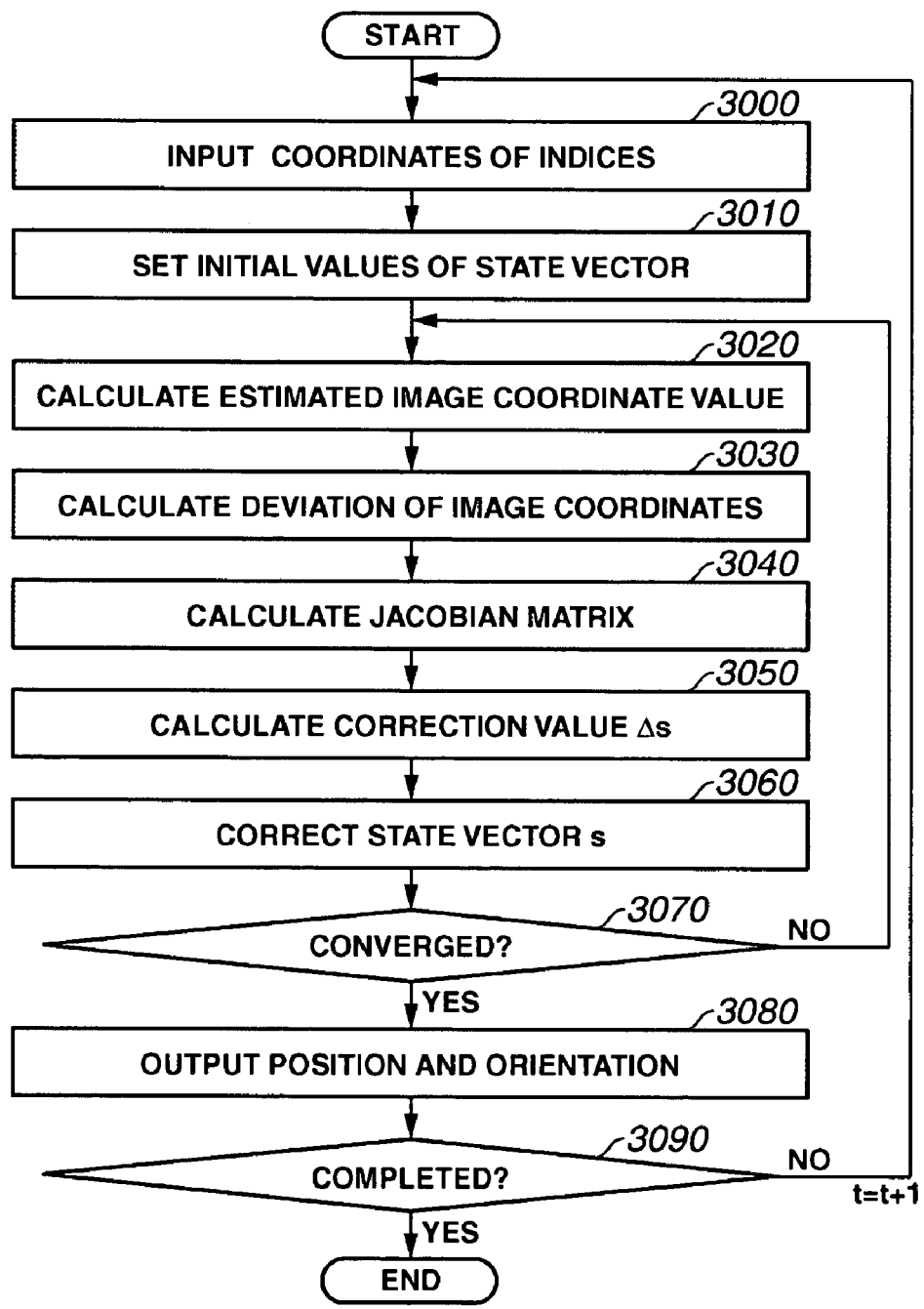
FIG. 3 is a flowchart showing the processing for calculating positions and orientations of an imaging apparatus and a measuring object body in accordance with the first exemplary embodiment.

FIG. 3 is a flowchart showing the processing performed in the position and orientation calculating section 130, which can be realized by the CPU 1001 that executes the program for realizing the function of the position and orientation calculating section 130. The program code of the flowchart is loaded from, for example, the external storage device 1007 to the RAM 1002, before starting the following processing.

In the following description, a 3-valued vector $t_{WO}=[x_{WO}\ y_{WO}\ z_{WO}]^T$ represents the position of the measuring object body 160 in the base coordinate system, a 3-valued vector $\omega_{WO}=[\xi_{WO}\ \Psi_{WO}\ \zeta_{WO}]^T$ represents the orientation of the measuring object body 160 in the base coordinate system, and a 6-valued vector $s_{WO}=[t_{WO}^T\ \omega_{WO}^T]^T$ represents the position and the orientation of the measuring object body 160 in the base coordinate system.

Furthermore, a 3-valued vector $t_{WC}=[x_{WC}\ y_{WC}\ z_{WC}]^T$ represents the position of the imaging apparatus 150 in the base coordinate system, a 3-valued vector $\omega_{WC}=[\xi_{WC}\ \Psi_{WC}\ \zeta_{WC}]^T$ represents the orientation of the imaging apparatus 150 in the base coordinate system, and a 6-valued vector $s_{WC}=[t_{WC}^T\ \omega_{WC}^T]^T$ represents the position and the orientation of the imaging apparatus 150 in the base coordinate system. In the following processing, a 12-valued state vector "s"=$[s_{WO}^T\ s_{WC}^T]^T=[x_{WO}\ y_{WO}\ z_{WO}\ \xi_{WO}\ \Psi_{WO}\ \zeta_{WO}\ x_{WC}\ y_{WC}\ z_{WC}\ \xi_{WC}\ \Psi_{WC}\ \zeta_{WC}]^T$ is unknown parameters to be derived as one-dimensional parameters representing the position and the orientation of the measuring object body 160 and the imaging apparatus 150 in the base coordinate system.

The orientation can be expressed with three values. The present exemplary embodiment uses a 3-valued vector having a vector size (or length) representing a rotational angle and a vector direction representing a rotational axis direction. The following equation (1), i.e., a rotation matrix R with 3 rows×3 columns, expresses an orientation ω.

Conversion between ω and R can be performed unequivocally. The method for converting R into ω is well known and will not be described below.

$$R(\omega) = \begin{bmatrix} \frac{\xi^2}{\theta^2}(1-\cos\theta)+\cos\theta & \frac{\xi\phi}{\theta^2}(1-\cos\theta)-\frac{\zeta}{\theta}\sin\theta & \frac{\xi\zeta}{\theta^2}(1-\cos\theta)+\frac{\phi}{\theta}\sin\theta \\ \frac{\phi\xi}{\theta^2}(1-\cos\theta)+\frac{\zeta}{\theta}\sin\theta & \frac{\phi^2}{\theta^2}(1-\cos\theta)+\cos\theta & \frac{\phi\zeta}{\theta^2}(1-\cos\theta)-\frac{\xi}{\theta}\sin\theta \\ \frac{\zeta\xi}{\theta^2}(1-\cos\theta)-\frac{\phi}{\theta}\sin\theta & \frac{\zeta\phi}{\theta^2}(1-\cos\theta)+\frac{\xi}{\theta}\sin\theta & \frac{\zeta^2}{\theta^2}(1-\cos\theta)+\cos\theta \end{bmatrix} \quad \text{Equation (1)}$$

where $$\theta = \sqrt{\xi^2+\phi^2+\zeta^2}$$

In step 3000 of FIG. 3, the position and orientation calculating section 130 inputs image coordinates $u_{dn}$ ($=u_{dn}^{Qkn}$) index identifier $k_n$ and camera identifier $d_n$, for each of detected indices $Q_{kn}$ (n=1, ... and N), from the index detecting section 120. In the present exemplary embodiment, three-dimensional coordinates $x_O^{Qkn}$ of each index defined in the object body coordinate system or three-dimensional coordinates $x_C^{Qkn}$ of each index defined in the inside-out camera coordinate system are known values loaded beforehand in the RAM 1002.

In step 3010, the position and orientation calculating section 130 sets appropriate initial values (i.e., estimated values representing the position and the orientation) for the state vector "s." For example, the values of a state vector "s" derived in the processing of a previous frame (time $t_{k-1}$) can be used as the initial values. Furthermore, estimated values based on variations of previously obtained state vectors "s" can be used as the initial values.

In step 3020, the position and orientation calculating section 130 calculates an estimated image coordinate value $u_n*$ for each of the indices $Q_{kn}$. The estimated image coordinate value $u_n*$ can be calculated based on an observation equation of an index defined by the state vector "s." The observation equation of the index can be defined in the following manner, considering the combination of the type of an observing camera (i.e., the imaging apparatus 150 or the outside-in camera 140) and the object body to which an observed index belongs to (i.e., the measuring object body 160 or the imaging apparatus 150).

(1) When an index on the measuring object body 160 is observed through the imaging apparatus 150, the observation equation (2) can be expressed as follows.

$$u_n^* = u_C^{Q_{k_n}*} = F_C\left(x_O^{Q_{k_n}}, s\right) \quad \text{Equation (2)}$$

The above observation equation includes the following equation (3) that obtains inside-out camera coordinates $x_C^{Q_{kn}}$ of the index from the object body coordinates $x_O^{Q_{kn}}$ of the index and the state vector "s."

$$x_C^{Q_{k_n}} = \begin{bmatrix} x_C^{Q_{k_n}} \\ y_C^{Q_{k_n}} \\ z_C^{Q_{k_n}} \end{bmatrix} \quad \text{Equation (3)}$$

$$= R(\omega_{WC})^{-1} \cdot \left(R(\omega_{WO}) \cdot x_O^{Q_{k_n}} + t_{WO} - t_{WC}\right)$$

Furthermore, the observation equation includes the following equation (4) that performs perspective projection conversion for obtaining inside-out image coordinates $u_C^{Q_{kn}*}$ from the inside-out camera coordinates $x_C^{Q_{kn}}$.

$$u_n^* = u_C^{Q_{k_n}*} \quad \text{Equation (4)}$$

$$= \begin{bmatrix} u_x^{Q_{k_n}*} & u_y^{Q_{k_n}*} \end{bmatrix}^T$$

$$= \begin{bmatrix} -f_x^C \frac{x_C^{Q_{k_n}}}{z_C^{Q_{k_n}}} & -f_y^C \frac{y_C^{Q_{k_n}}}{z_C^{Q_{k_n}}} \end{bmatrix}^T$$

In the above equations, $f^C_x$ and $f^C_y$ are focal lengths of the imaging apparatus 150 in x-axis and y-axis directions that are loaded beforehand as known values in the RAM 1002.

(2) When an index on the measuring object body 160 is observed through the outside-in camera 140, the observation equation (5) can be expressed as follows.

$$u_n^* = u_B^{Q_{k_n}*} = F_B\left(x_O^{Q_{k_n}}, s\right) \quad \text{Equation (5)}$$

The above observation equation (5) includes the following equation (6) that obtains outside-in camera coordinates $x_B^{Q_{kn}}$ of the index from the object body coordinates $x_O^{Q_{kn}}$ of the index and the state vector "s."

$$x_B^{Q_{k_n}} = \begin{bmatrix} x_B^{Q_{k_n}} \\ y_B^{Q_{k_n}} \\ z_B^{Q_{k_n}} \end{bmatrix} = R_{WB}^{-1} \cdot \left(R(\omega_{WO}) \cdot x_B^{Q_{k_n}} + t_{WO} - t_{WB}\right) \quad \text{Equation (6)}$$

Furthermore, the observation equation includes the following equation (7) that performs perspective projection conversion for obtaining outside-in image coordinates $u_B^{Q_{kn}*}$ from the outside-in camera coordinates $x_B^{Q_{kn}}$.

$$u_n^* = u_B^{Q_{k_n}*} \quad \text{Equation (7)}$$

$$= \begin{bmatrix} u_x^{Q_{k_n}*} & u_y^{Q_{k_n}*} \end{bmatrix}^T$$

$$= \begin{bmatrix} -f_x^B \frac{x_B^{Q_{k_n}}}{z_B^{Q_{k_n}}} & -f_y^B \frac{y_B^{Q_{k_n}}}{z_B^{Q_{k_n}}} \end{bmatrix}^T$$

In the above equations, $R_{WB}$ is a rotation matrix with 3 rows×3 columns that represents the orientation of the outside-in camera 140 in the base coordinate system, $t_{WB}$ is a 3-valued vector representing the position of the outside-in camera 140 in the base coordinate system, $f^B_x$ and $f^B_y$ are focal lengths of the outside-in camera 140 in x-axis and y-axis directions, which are loaded beforehand as known values in the RAM 1002.

Although the symbol B is used for a respective outside-in camera 140, the parameter can be selected for each of focal length, position, and orientation depending on an outside-in camera actually selected for the observation.

(3) When an index on the imaging apparatus 150 is observed through the outside-in camera 140, the observation equation (8) can be expressed as follows.

$$u_n^* = u_B^{Q_{k_n}^T} = F_B'\left(x_C^{Q_{k_n}}, s\right) \quad \text{Equation (8)}$$

The above observation equation (8) includes the following equation (9) that obtains outside-in camera coordinates $x_B^{Q_{kn}}$ of the index from the inside-out camera coordinates $x_C^{Q_{kn}}$ of the index and the state vector "s."

$$x_B^{Q_{k_n}} = \begin{bmatrix} x_B^{Q_{k_n}} \\ y_B^{Q_{k_n}} \\ z_B^{Q_{k_n}} \end{bmatrix} = R_{WB}^{-1} \cdot \left(R(\omega_{WC}) \cdot x_C^{Q_{k_n}} + t_{WC} - t_{WB}\right) \quad \text{Equation (9)}$$

Furthermore, the observation equation includes the equation (7) that performs the perspective projection conversion.

In step 3030, the position and orientation calculating section 130 calculates a deviation $\Delta u_n$ between the estimated image coordinate value $u_n*$ and a measured value un, for each of the indices $Q_{kn}$, according to the following equation (10).

$$\Delta u_n = u_n - u_n^* \quad \text{Equation (10)}$$

In step 3040, the position and orientation calculating section 130 calculates, for each of the indices $Q_{kn}$, image Jacobian relating to the state vector "s", i.e., $J_{us}^{Q_{kn}}$ ($=\partial u/\partial s$).

The image Jacobian is a Jacobian matrix with 2 rows×12 columns, whose elements are solutions obtained when partial differentiation is applied to the observation equation expressed by the equation (2), the equation (5), or the equation (8) with respect to each element of the state vector "s."

More specifically, in the case of observing an index on the measuring object body 160 through the imaging apparatus 150 ((1) of step 3030), the position and orientation calculating section 130 calculates Jacobian matrix $J_{ux}^{Qkn}$ ($=\partial u/\partial x$) with 2 rows×3 columns, whose elements are solutions obtained when partial differentiation is applied to the right side of the equation (4) with respect to each element of the inside-out camera coordinates, and Jacobian matrix $J_{xs}^{Qkn}$ ($=\partial x/\partial s$) with 3 rows×12 columns, whose elements are solutions obtained when partial differentiation is applied to the right side of the equation (3) with respect to each element of the state vector "s." Then, the position and orientation calculating section 130 calculates $J_{us}^{Qkn}$ according to the following equation (11).

$$J_{us}^{Qkn} = J_{ux}^{Qkn} \cdot J_{xs}^{Qkn} \qquad \text{Equation (11)}$$

Similarly, in the case of observing an index on the measuring object body 160 through the outside-in camera 140 ((2) of step 3030), the position and orientation calculating section 130 calculates the Jacobian matrix by applying partial differentiation to the right side of the equation (7) with respect to each element of the outside-in camera coordinates, and the Jacobian matrix by applying partial differentiation to the right side of the equation (6) with respect to each element of the state vector "s."

Then, similar to the equation (11), the position and orientation calculating section 130 calculates $J_{us}^{Qkn}$ as a product of two Jacobian matrices. In this case, the equation (6) does not include the parameters relating to the position and the orientation of the imaging apparatus 150. Thus, all elements relating to $s_{WC}$ in the image Jacobian $J_{us}^{Qkn}$ are obtained as 0 in this observation.

Similarly, in the case of observing an index on the imaging apparatus 150 through the outside-in camera 140 ((3) of step 3030), the position and orientation calculating section 130 calculates the Jacobian matrix by applying partial differentiation to the right side of the equation (7) with respect to each element of the outside-in camera coordinates, and the Jacobian matrix by applying partial differentiation to the right side of the equation (9) with respect to each element of the state vector "s."

Then, similar to the equation (11), the position and orientation calculating section 130 calculates $J_{us}^{Qkn}$ as a product of two Jacobian matrices. In this case, the equation (9) does not include the parameters relating to the position and the orientation of the measuring object body 160. Thus, all elements relating to $s_{WO}$ in the image Jacobian $J_{us}^{Qkn}$ are obtained as 0 in this observation.

In step 3050, the position and orientation calculating section 130 calculates a correction value Δs of the state vector "s" based on the deviation and the image Jacobian calculated in the steps 3030 and 3040. More specifically, the position and orientation calculating section 130 obtains a 2N-dimensional deviation vector U whose elements are deviations $\Delta u_n$ (n= 1, - - -, N) vertically disposed as shown below in Equation (12).

$$U = \begin{bmatrix} \Delta u_1 \\ \vdots \\ \Delta u_N \end{bmatrix} \qquad \text{Equation (12)}$$

Then, the position and orientation calculating section 130 obtains a matrix Θ with 2N rows×12 columns whose elements are image Jacobian $J_{us}^{Qkn}$ vertically disposed as shown in Equation (13)

$$\Theta = \begin{bmatrix} J_{us}^{Q_{k_1}} \\ \vdots \\ J_{us}^{Q_{k_N}} \end{bmatrix} \qquad \text{Equation (13)}$$

Then, the position and orientation calculating section 130 calculates the correction value Δs of the state vector "s" as a pseudo inverse matrix $\Theta^+$ of the obtained matrix Θ shown in Equation (14).

$$\Delta s = \Theta^+ U \qquad \text{Equation (14)}$$

In step 3060, the position and orientation calculating section 130 corrects the state vector "s" based on the correction value Δs calculated in step 3050 according to the following equation (15).

$$s + \Delta s \to s \qquad \text{Equation (15)}$$

Then, the position and orientation calculating section 130 recognizes the corrected value as a new estimated value.

In step 3070, the position and orientation calculating section 130 determines whether or not the calculation has converged. For example, the position and orientation calculating section 130 can determine whether the deviation vector U is smaller than a predetermined threshold value, or whether the correction value Δs is smaller than a predetermined threshold value.

When no convergence is recognized (i.e., NO in step 3070), the processing flow returns to the step 3020 to execute the above-described processing again with a corrected state vector "s." When the calculation has converged (i.e., YES in step 3070), the processing flow proceeds to step 3080.

In step 3080, the position and orientation calculating section 130 outputs the state vector "s" obtained in the above-described processing, as estimated values for the position and orientation of the imaging apparatus 150 and the measuring object body 160, via the interface 1009 to the external devices. Alternatively, the position and orientation calculating section 130 stores, in the RAM 1002, these data so that other applications can use the data.

In the present exemplary embodiment, there are various methods for expressing the data used in outputting positions and orientations. As described above, 6-valued parameters can be used to express positions and orientations of respective objects (the imaging apparatus 150 and the measuring object body 160).

Other expressions can also be used. For example, in obtaining orientations of respective objects, a rotation matrix with 3 rows×3 columns can be obtained from the 3-valued vector of the orientation according to the equation (1), and the 3-valued vector of the position and the 3×3 matrix of the orientation can be output. The orientation can be converted into a Euler angle or into a quaternion and output.

A position and orientation conversion matrix with 4 rows×4 columns according to a homogeneous coordinate expression, or its inverse matrix, can be output. Furthermore, the position and the orientation of the measuring object body 160 relative to the imaging apparatus 150 can be obtained and output.

Alternatively, the position and the orientation of the imaging apparatus 150 relative to the measuring object body 160 can be obtained and output. These methods can be combined.

In step 3090, the position and orientation calculating section 130 determines whether the processing has completed. When the processing has not yet completed (i.e., NO in step 3090), the processing flow returns to step 3000 to execute the above-described processing for input data of the next frame.

As apparent from the foregoing description, positions and orientations of the measuring object body 160 and the imaging apparatus 150 can be estimated at the same time based on the information of the imaging apparatus 150 and the outside-in camera 140 that are obtained at the same time.

The position and orientation measuring apparatus according to the present exemplary embodiment can obtain the solution(s) causing no contradiction against the information relating to the relative position and the relative orientation between the imaging apparatus 150 and the measuring object body 160 that can be obtained from an image of the imaging apparatus 150, or against the information relating to the absolute position and the absolute orientation between respective measuring object bodies that can be obtained from an image of the outside-in camera 140.

Therefore, the position and orientation measuring apparatus according to the present exemplary embodiment can maintain reliability in absolute accuracy and minimize the positional deviation, and thus can realize a position and orientation measurement preferably used for presenting a mixed reality.

Second Exemplary Embodiment

The position and orientation measuring apparatus according to a second exemplary embodiment can measure positions and orientations of two measuring object bodies. For example, an optical see-through HMD (head mounted display) can be used to display a combined image of a physical space and information, to realize an application that can display the information superimposed on a hand-held object. In such a case, for the purpose of measuring positions and orientations of both the HMD and the hand-held object, the position and orientation measuring apparatus according to the present exemplary embodiment can be used.

The position and orientation measuring apparatus according to the present exemplary embodiment differs from that of the first exemplary embodiment in that plural inside-out cameras are provided to obtain an inside-out image and plural orientation sensors are provided to measure the orientation of an object. In the following description, the position and orientation measuring apparatus according to the second exemplary embodiment and a related position and orientation measuring method will be described chiefly for the portions different from those of the first exemplary embodiment.

Figure 4:
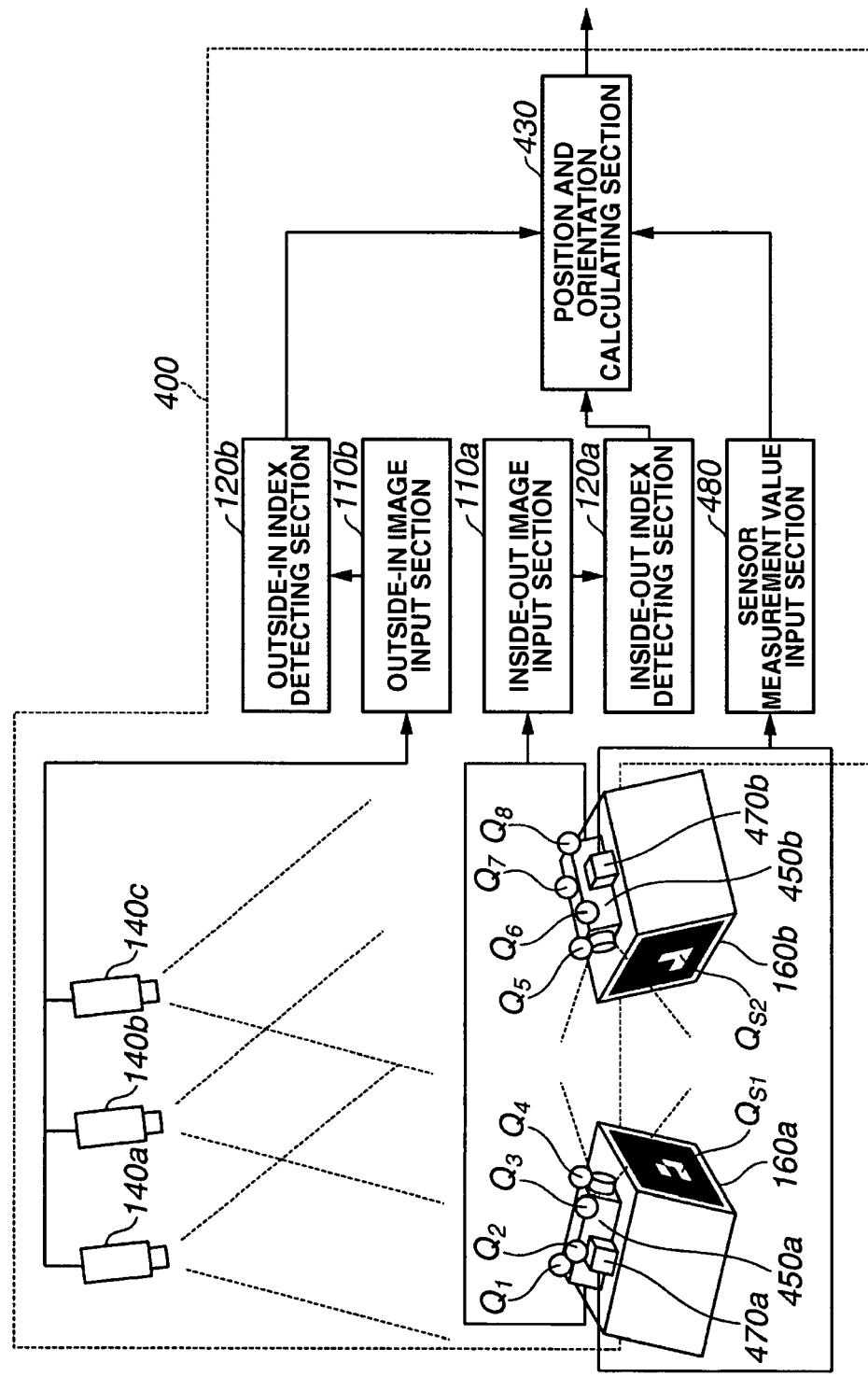
FIG. 4 is a diagram showing the arrangement of a position and orientation measuring apparatus in accordance with a second exemplary embodiment.

FIG. 4 shows the arrangement of a position and orientation measuring apparatus 400 according to the second exemplary embodiment. As shown in FIG. 4, the position and orientation measuring apparatus 400 includes, in addition to the image input section 110, the index detecting section 120, and the outside-in camera 140 of the first exemplary embodiment, a position and orientation calculating section 430, plural inside-out cameras 450a and 450b, plural orientation sensors 470a and 470b, and a sensor measurement value input section 480.

The position and orientation measuring apparatus 400 according to the present exemplary embodiment can measure positions and orientations of two measuring object bodies 160a and 160b. For example, one measuring object body 160b is an optical see-through HMD and the other measuring object body 160a is an observed object body (i.e., an object to be combined and displayed with the information).

The portions (110, 120, and 140) denoted by the same reference numerals as those in the first exemplary embodiment (shown in FIG. 1) and described above can function in the same manner and will not be described below. The second exemplary embodiment differs from the first exemplary embodiment in that each of two inside-out cameras 450a and 450b obtains an image that is input as an inside-out image to the inside-out image input section 110a. The inside-out index detecting section 120a executes the index detection processing for each input image.

As shown in FIG. 4, the measuring object body 160 has plural positions where plural indices $Q_k$ are disposed. The positions of respective indices $Q_k$ are defined beforehand in respective object body coordinate systems (expressed with "symbols $O_1$ and $O_2$" in the following description. Similar to the first exemplary embodiment, the indices $Q_k$ can be configured into any other indices if the image coordinates of each index can be detected when it is projected on a photographed image and when this index can be discriminated according to an appropriate method.

According to the above-described first exemplary embodiment, all indices on the measuring object body 160 are the same type and the common index is detected from an outside-in image and an inside-out image. However, in the present exemplary embodiment, the index (or indices) observed/detected by the outside-in camera 140 is differentiated in the type from the index (or indices) observed or detected by the inside-out camera 450.

According to the example of FIG. 4, spherical indices $Q_1$ to $Q_8$ are disposed on the inside-out cameras 450a and 450b so that the outside-in camera 140 can observe these indices $Q_1$ to $Q_8$. Rectangular indices $Q_{s1}$ and $Q_{s2}$ are disposed on the front faces of the measuring object bodies 160a and 160b so that the inside-out cameras 450a and 450b can observe these indices $Q_{s1}$ and $Q_{s2}$.

Using plural types of indices in this manner is preferable when the distances of respective indices from the camera are different from each other. It is also possible to use the same or common indices, as disclosed in the first exemplary embodiment. According to the example of FIG. 4, the indices $Q_1$ to $Q_8$ are disposed on the inside-out camera 450, not on the measuring object body 160. The indices can be disposed at any places if their positions are known beforehand in the object body coordinate system.

The inside-out cameras 450a and 450b are, for example, plural video cameras mounted on the measuring object bodies 160a and 160b, respectively. The position and the orientation of the inside-out cameras 450a and 450b are known beforehand in respective object body coordinate systems. One inside-out camera 450a (450b) obtains an image of the measuring object body 160b (160a) mounted on the other inside-out camera 450b (450a), as an image observed from an inside-out position of the measuring object body 160a (160b). The obtained images are entered into the inside-out image input section 110a. In the following description, the inside-out camera coordinate systems defined by respective inside-out cameras 450a and 450b are expressed with symbols $C_1$ and $C_2$.

The orientation sensors 470a and 470b are mounted on the measuring object bodies 160a and 160b, respectively. The orientation sensors 470a and 470b are, for example, a gyro sensor or a gyro sensor unit (e.g., TISS-5-40 of Tokimec, Inc., or InertiaCube2 of InterSense Inc.). The orientation of respective orientation sensors 470a and 470b can be known beforehand in respective object body coordinate systems. Each orientation sensor 470 can measure the orientation of an associated measuring object body 160 in the base coordinate system and can output the measured orientation to the sensor measurement value input section 480.

The sensor measurement value input section 480 can input orientation measurement values from respective orientation sensors 470a and 470b, and can output the entered measurement values to the position and orientation calculating section 430.

The position and orientation calculating section 430 can input image coordinates of respective indices from the index detecting section 120, and can input the orientation measurement values from the sensor measurement value input section 480. Then, the position and orientation calculating section 430 can calculate positions and orientations of respective measuring object bodies 160a and 160b based on the obtained information, and can output the calculated position and orientation.

At least part of the image input section 110, the index detecting section 120, the sensor measurement value input section 480, and the position and orientation calculating section 430 shown in FIG. 4 can be either implemented using a single apparatus or multiple apparatuses. Furthermore, software equivalent to the image input section 110, the index detecting section 120, the sensor measurement value input section 480, and the position and orientation calculating section 430 can be installed on one or plural computers. A CPU of the computer can execute the software to realize the functions of these sections.

In the present exemplary embodiment, respective sections (i.e., the image input section 110, the index detecting section 120, the sensor measurement value input section 480, and the position and orientation calculating section 430) can be realized by the software that is installed on the same computer. The fundamental configuration of a computer that can execute the software to realize the functions of respective sections is the same as that described in the first exemplary embodiment and therefore will not be described below. Part of the function of the sensor measurement value input section 480 can be realized by the interface 1009 (e.g., a USB port).

Figure 5:
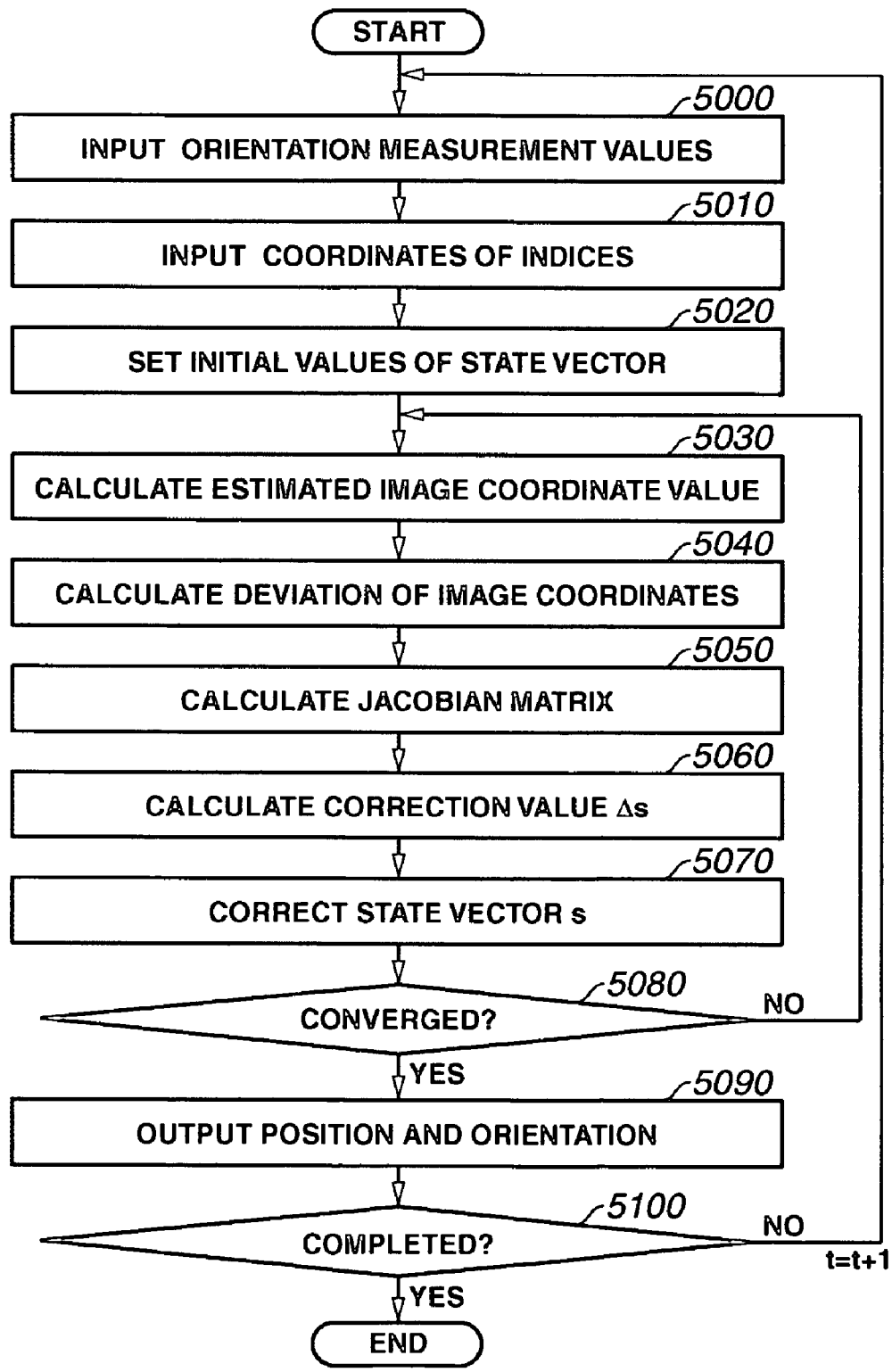
FIG. 5 is a flowchart showing the processing for calculating positions and orientations of measuring object bodies in accordance with the second exemplary embodiment.

FIG. 5 is a flowchart showing the processing of the position and orientation calculating section 430 in the second exemplary embodiment which is performed by the CPU 1001 that executes the program for realizing the functions of the position and orientation calculating section 430. The program code of the flowchart is loaded, for example from the external storage device 1007 to the RAM 1002, before starting the following processing.

In step 5000, the position and orientation calculating section 430 inputs orientation measurement values of respective measuring object bodies 160a and 160b (expressed as rotation matrices $R_{WO1}$ and $R_{WO2}$ with 3 rows×3 columns, in the following description) from the sensor measurement value input section 480.

In the present exemplary embodiment, the orientation measurement values measured by the orientation sensors 470a and 470b are sufficiently reliable and accordingly the orientations $R_{WO1}$ and $R_{WO2}$ of the measuring object bodies 160a and 160b are entered as correct values in the step 5000. According to the first exemplary embodiment, a total of 12 unknown parameters represent positions and orientations of two objects.

In the present exemplary embodiment, respective measuring object bodies 160a and 160b have orientations that are known beforehand. Accordingly, it is only necessary to obtain their positions from the image information. In the following description, a 6-valued state vector "s"=$[t_{WO1}{}^T \; t_{WO2}{}^T]^T$= $[x_{WO1} \; y_{WO1} \; z_{WO1} \; x_{WO2} \; y_{WO2} \; z_{WO2}]^T$ includes one-dimensional parameters (i.e., position data of the measuring object bodies 160a and 160b) as unknown parameters to be derived.

In step 5010, the position and orientation calculating section 430 inputs image coordinates $u_n$ (=$u_{dn}{}^{Qkn}$), index identifier $k_n$ and camera identifier $d_n$, for each of detected indices $Q_{kn}$ (n=1, - - -, and N), from the index detecting section 120. In the present exemplary embodiment, three-dimensional coordinates $x_{O1}{}^{Qkn}$ or $x_{O2}{}^{Qkn}$ of each index defined in the object body coordinate system are known values loaded beforehand in the RAM 1002.

In step 5020, the position and orientation calculating section 430 sets appropriate initial values (i.e., estimated values representing the position) for the state vector "s.". For example, the values of a state vector "s" derived in the processing of a previous frame (time $t_{k-1}$) can be used as the initial values. Furthermore, estimated values based on variations of previously obtained state vectors "s" can be used as the initial values.

In step 5030, the position and orientation calculating section 430 calculates an estimated image coordinate value un for each of the indices $Q_{kn}$. The estimated image coordinate value $u_n{}^*$ can be calculated based on an observation equation of an index defined by the state vector "s." The observation equation of the index can be defined in the following manner, considering the combination of an observing camera and the object body to which an observed index belongs to.

When an index on the measuring object body 160a is observed through the inside-out camera 450b, the observation equation can be expressed as follows. The above observation equation includes the following equation (16) that obtains inside-out camera coordinates $x_{C2}{}^{Qkn}$ of the index from the object body coordinates $x_{O1}{}^{Qkn}$ of the index and the state vector "s."

$$x_{C2}{}^{Qkn} = R_{O2C2}{}^{-1} \cdot (R_{WO2}{}^{-1} \cdot (R_{WO1} \cdot x_{O1}{}^{Qkn} + t_{WO1} - t_{WO2}) - t_{O2C2}) \quad \text{Equation (16)}$$

Furthermore, the observation equation (16) includes the equation (4) expressing the perspective projection conversion. When an index on the measuring object body 160b is observed through the inside-out camera 450a, the observation equation can be expressed in the same manner, although the equation (16) is replaced with the next equation (17).

$$x_{C1}{}^{Qkn} = R_{O1C1}{}^{-1} \cdot (R_{WO1}{}^{-1} \cdot (R_{WO2} \cdot x_{O2}{}^{Qkn} + t_{WO2} - t_{WO1}) - t_{O1C1}) \quad \text{Equation (17)}$$

In the above equations, $R_{O2C2}$ and $t_{O2C2}$ represent the orientation and the position of the inside-out camera 450b in the object body coordinate system $O_2$, and $R_{O1C1}$ and $t_{O1C1}$ represent the orientation and the position of the inside-out camera 450a of the object body coordinate system $O_1$. Moreover, $f^C{}_x$ and $f^C{}_y$ in the equation (4) are focal lengths of respective cameras that are loaded beforehand as known values in the RAM 1002. If plural inside-out cameras are mounted on one measuring object body 160, different parameters can be used for respective inside-out cameras.

When an index on the measuring object body 160 is observed through the outside-in camera 140, the observation equation can be obtained in the same manner as in the first exemplary embodiment (equations (5) through (7)) and accordingly will not be described below. However, the orientation sensor can obtain $R_{WO}$ as the orientation of the measuring object body 160. Thus, in the equation (6), the item of R ($\omega_{WO}$) must be replaced with the measurement value $R_{WO}$.

In step 5040, the position and orientation calculating section 430 calculates a deviation $\Delta u_n$ between the estimated image coordinate value $u_n{}^*$ and a measured value $u_n$, for each of the indices $Q_{kn}$, according to the equation (10).

In step 5050, the position and orientation calculating section 430 calculates, for each of the indices $Q_{kn}$, image Jacobian relating to the state vector "s", i.e., $J_{us}{}^{Qkn}$ (=$\partial u/\partial s$). The image Jacobian is a Jacobian matrix with 2 rows×6 columns, whose elements are solutions obtained when partial differentiation is applied to the observation equation with respect to each element of the state vector "s." The method for calculating the image Jacobian is similar to that described in the first exemplary embodiment except that the equations (16) and (17) are used to constitute the observation equation, and therefore will not be described below.

In step 5060, the position and orientation calculating section 430 calculates a correction value $\Delta s$ of the state vector "s" based on the deviation and the image Jacobian calculated in steps 5040 and 5050. More specifically, the position and orientation calculating section 430 obtains a 2N-dimensional deviation vector U whose elements are deviations $\Delta u_n$ (n=

1, . . . , N) vertically disposed. Then, the position and orientation calculating section 430 obtains a matrix $\Theta$ with 2N rows×6 columns, whose elements are image Jacobian $J_{us}^{Qkn}$ vertically disposed. Then, the position and orientation calculating section 430 calculates $\Delta s$ according to the equation (14).

In step 5070, the position and orientation calculating section 430 corrects the state vector "s" based on the correction value $\Delta s$ calculated in step 5060 according to equation (15). Then, the position and orientation calculating section 430 recognizes the corrected value as a new estimated value.

In step 5080, the position and orientation calculating section 430 determines whether or not the calculation has converged. When no convergence is recognized (i.e., NO in step 5080), the processing flow returns to the step 5030 to execute the above-described processing again with a corrected state vector "s." When the calculation has converged (i.e., YES in step 5080), the processing flow proceeds to step 5090.

In step 5090, the position and orientation calculating section 430 outputs the state vector "s" obtained in the above-described processing, as estimated values for the position and orientation of the measuring object bodies 160a and 160b, together with the orientation measurement values entered in step 5000, via the interface 1009 to the external devices. Alternatively, the position and orientation calculating section 430 stores, in the RAM 1002, these data so that other applications can use the data.

In step 5100, the position and orientation calculating section 430 determines whether the processing has completed. When the processing has not yet completed (i.e., NO in step 5100), the processing flow returns to step 5000 to execute the above-described processing for input data of the next frame.

As is apparent from the foregoing description, positions and orientations of the measuring object bodies 160a and 160b can be measured. The position and orientation measuring apparatus according to the present exemplary embodiment can obtain the solution(s) causing no contradiction against the information relating to the relative position and the relative orientation between the measuring object bodies 160a and 160b, or against the information relating to the absolute position and the absolute orientation between respective measuring object bodies. Therefore, the position and orientation measuring apparatus according to the present exemplary embodiment can realize accurate and reliable position and orientation measurement.

The present exemplary embodiment uses two inside-out cameras 450a and 450b. However, the information relating to a relative position and the relative orientation can be obtained from one inside-out camera. Thus, to realize a simple arrangement, the present exemplary embodiment can omit one of the inside-out cameras 450a and 450b.

Third Exemplary Embodiment

The position and orientation measuring apparatus according to a third exemplary embodiment can measure positions and orientations of the imaging apparatus and the measuring object body. In the following description, the position and orientation measuring apparatus according to the third exemplary embodiment and a related position and orientation measuring method will be described chiefly for the portions different from those of the first and second exemplary embodiments.

FIG. 6 shows the arrangement of a position and orientation measuring apparatus 600 according to the third exemplary embodiment. As shown in FIG. 6, the position and orientation measuring apparatus 600 includes the image input section 110, the index detecting section 120, the inside-out camera 450 (450a and 450b), the orientation sensor 470 (470a and 470b), the sensor measurement value input section 480, and a position and orientation calculating section 630.

The position and orientation measuring apparatus 600 according to the third exemplary embodiment can measure positions and orientations of the imaging apparatus 150 and the measuring object body 160.

The portions (110 and 120) denoted by the same reference numerals as those described in the first exemplary embodiment (shown in FIG. 1) can function in the same manner and will not be described below. The third exemplary embodiment differs from the first exemplary embodiment in that the outside-in image input section 110b and the outside-in index detecting section 120b are not provided.

Furthermore, the third exemplary embodiment differs from the first exemplary embodiment in that images obtained by two inside-out cameras 450a and 450b and the imaging apparatus 150 are input as inside-out images to the image input section 110, and the index detecting section 120 executes the index detection processing for each input image.

Similarly, the portions (450, 470, and 480) denoted by the same reference numerals as those disclosed in the second exemplary embodiment (shown in FIG. 4) can function in the same manner and will not be described below.

However, the third exemplary embodiment differs from the second exemplary embodiment in that the combination of the inside-out camera 450 (450a and 450b) and the orientation sensor 470 (470a and 470b) is provided for each of the measuring object body 160 and the imaging apparatus 150. Furthermore, the third exemplary embodiment differs from the second exemplary embodiment in that respective inside-out cameras 450a and 450b are directed upward when the measuring object body 160 and the imaging apparatus 150 are placed in the standard orientation.

The measuring object body 160 has plural positions where plural indices $Q_k$ are disposed. The positions of respective indices $Q_k$ are defined beforehand in an object body coordinate system on the measuring object body 160. Similar to other exemplary embodiments, the indices $Q_k$ can be configured into any other indices if the image coordinates of each index can be detected when it is projected on a photographed image and when this index can be discriminated according to an appropriate method.

The imaging apparatus 150 is, for example, a video camera. The position and orientation measuring apparatus 600 can input an image obtained by the imaging apparatus 150. In the following description, the camera coordinate system defined by the imaging apparatus 150 is expressed with a symbol C.

The imaging apparatus 150 and the inside-out camera 450 can observe and image plural indices disposed at plural positions in the physical space. The positions of respective indices are known beforehand in the base coordinate system. According to the example of FIG. 6, a total of nine rectangular indices $Q_{S2}$ to $Q_{S10}$ are provided on a ceiling surface and a total of five rectangular indices $Q_{S11}$ to $Q_{S15}$ are provided on side wall surface or a floor surface.

As shown in FIG. 6, the indices $Q_{S2}$ to $Q_{S10}$ can be observed and imaged by the inside-out camera 450 and the indices $Q_{S11}$ to $Q_{S15}$ can be observed and imaged by the imaging apparatus 150. However, it is not necessary to separate the indices. The indices can be configured into any other indices if the image coordinates of each index can be detected when it is projected on a photographed image and when this index can be discriminated according to an appropriate method. The indices to be detected by the imaging apparatus 150 can be differentiated in the type from the indices to be detected by the inside-out camera 450. On the other hand, the same type of indices can be used as shown in FIG. 6.

The position and orientation calculating section 630 can input image coordinates of respective indices from the index detecting section 120, and can input orientation measurement values from the sensor measurement value input section 480. The position and orientation calculating section 630 can calculate positions and orientations of the imaging apparatus 150 and the measuring object body 160, based on the obtained information, and can output the calculated position and orientation.

At least part of the image input section 110, the index detecting section 120, the sensor measurement value input section 480, and the position and orientation calculating section 630 shown in FIG. 6 can be configured as an independent (separate) apparatus. Furthermore, software equivalent to the image input section 110, the index detecting section 120, the sensor measurement value input section 480, and the position and orientation calculating section 630 can be installed on one or plural computers. A CPU of the computer can execute the software to realize the functions of these sections.

In the present exemplary embodiment, respective sections (i.e., the image input section 110, the index detecting section 120, the sensor measurement value input section 480, and the position and orientation calculating section 630) can be realized by the software that is installed on the same computer. The fundamental configuration of a computer that can execute the software to realize the functions of respective sections is with the same as that described in the first exemplary embodiment and therefore will not be described below.

The processing of the position and orientation calculating section 630 will be described below with reference to the flowchart of FIG. 5.

In step 5000, the position and orientation calculating section 630 inputs orientation measurement values of the imaging apparatus 150 and the measuring object body 160 (expressed as rotation matrices $R_{WC}$ and $R_{WO}$ with 3 rows×3 columns, in the following description) from the sensor measurement value input section 480.

In the present exemplary embodiment, the orientation measurement values are entered as correct values in the step 5000 and a 6-valued state vector "s"=$[t_{WC}^T \, t_{WO}^T]^T = [x^{WC} \, y_{WC} \, z_{WC} \, x_{WO} \, y_{WO} \, z_{WO}]^T$ including one-dimensional position data of the measuring object body 160 and the imaging apparatus 150 as unknown parameters to be derived.

In step 5010, the position and orientation calculating section 630 inputs image coordinates $u_n$ (=$u_{dn}^{Qkn}$), index identifier $k_n$ and camera identifier $d_n$, for each of detected indices $Q_{kn}$ (n=1, . . . , and N), from the index detecting section 120. In the present exemplary embodiment, three-dimensional coordinates $x_O^{Qkn}$ of each index defined in the object body coordinate system or three-dimensional coordinates $x_W^{Qkn}$ of each index defined in the base coordinate system are known values loaded beforehand in the RAM 1002.

In step 5020, the position and orientation calculating section 630 sets appropriate initial values (i.e., estimated values representing the position) for the state vector "s."

In step 5030, the position and orientation calculating section 630 calculates an estimated image coordinate value $u_n^*$ for each of the indices $Q_{kn}$. The estimated image coordinate value $u_n^*$ can be calculated based on an observation equation of an index defined by the state vector "s." The observation equation of the index can be defined in the following manner, considering the combination of an observing camera and the object body to which an observed index belongs.

When an index on the measuring object body 160 is observed through the imaging apparatus 150, the observation equation can be obtained in the same manner as in the first exemplary embodiment (equations (2) through (4)) and accordingly will not be described below. However, the orientation sensors can obtain orientations of the measuring object body 160 and the imaging apparatus 150. Thus, in the equation (3), the items of $R(\omega_{WO})$ and $R(\omega_{WC})$ are replaced with the measurement value $R_{WO}$ and $R_{WC}$.

When an index in the base coordinate system is observed through the imaging apparatus 150, the inside-out camera 450a, and the inside-out camera 450b, the observation equation includes the following equations (18)-(20).

$$X_C^{Qkn} = R_{WC}^{-1} \cdot (X_W^{Qkn} - t_{WC}) \qquad \text{Equation (18)}$$

$$X_{C1}^{Qkn} = R_{OC1}^{-1} \cdot (R_{WO}^{-1} \cdot (X_W^{Qkn} - t_{WO}) - t_{OC1}) \qquad \text{Equation (19)}$$

$$X_{C2}^{Qkn} = R_{CC2}^{-1} \cdot (R_{WC}^{-1} \cdot (X_W^{Qkn} - t_{WC}) - t_{CC2}) \qquad \text{Equation (20)}$$

Furthermore, the observation equation includes the equation (4) expressing the perspective projection conversion. In the above equations, $R_{OC1}$ and $t_{OC1}$ represent the orientation and the position of the inside-out camera 450a in the object body coordinate system O, and $R_{CC2}$ and $t_{CC2}$ represent the orientation and the position of the inside-out camera 450b in the camera coordinate system C. These data are loaded beforehand, as known values, in the RAM 1002. Furthermore, $f_x^C$ and $f_y^C$ in the equation (4) are focal lengths of respective cameras that are loaded beforehand as known values in the RAM 1002.

In step 5040, the position and orientation calculating section 630 calculates a deviation $\Delta u_n$ between the estimated image coordinate value $u_n^*$ and a measured value $u_n$, for each of the indices $Q_{kn}$, according to the equation (10).

In step 5050, the position and orientation calculating section 630 calculates, for each of the indices $Q_{kn}$, image Jacobian relating to the state vector "s", i.e., $J_{us}^{Qkn}$ (=∂u/∂s). The image Jacobian is a Jacobian matrix with 2 rows×6 columns, whose elements are solutions obtained when partial differentiation is applied to the observation equation with respect to each element of the state vector "s." The method for calculating the image Jacobian is similar to that described in the first exemplary embodiment except that the equations (18) through (20) are used for the observation equation, and therefore will not be described below.

In step 5060, the position and orientation calculating section 630 calculates a correction value $\Delta s$ of the state vector "s" based on the deviation and the image Jacobian calculated in steps 5040 and 5050. More specifically, the position and orientation calculating section 630 obtains a 2N-dimensional deviation vector U whose elements are deviations $\Delta u_n$ (n=1, . . . , N) vertically disposed. The position and orientation calculating section 630 then obtains a matrix Θ with 2N rows×6 columns, whose elements are image Jacobian $J_{us}^{Qkn}$ vertically disposed. Then, the position and orientation calculating section 630 calculates $\Delta s$ according to the equation (14).

In step 5070, the position and orientation calculating section 630 corrects the state vector "s" based on the correction value $\Delta s$ calculated in step 5060 according to equation (15). Then, the position and orientation calculating section 630 recognizes the corrected value as a new estimated value.

In step 5080, the position and orientation calculating section 630 determines whether or not the calculation has converged. When no convergence is recognized (i.e., NO in step 5080), the processing flow returns to the step 5030 to execute the above-described processing again with a corrected state vector "s." When the calculation has converged (i.e., YES in step 5080), the processing flow proceeds to step 5090.

In step 5090, the position and orientation calculating section 630 outputs the state vector "s" obtained in the above-described processing, as positions of the imaging apparatus 150 and the measuring object body 160, together with the orientation measurement values entered in the step 5000, via the interface 1009 to the external devices. Alternatively, the position and orientation calculating section 630 stores, in the RAM 1002, these data so that other applications can use the data.

In step 5100, the position and orientation calculating section 630 determines whether the processing has completed. When the processing has not yet completed (i.e., NO in step 5100), the processing flow returns to step 5000 to execute the above-described processing for input data of the next frame.

With the above-described processing, the position and the orientation of each measuring object can be measured. The position and orientation measuring apparatus according to the present exemplary embodiment can obtain the solution(s) causing no contradiction against the information relating to the relative position and the relative orientation between the imaging apparatus 150 and the measuring object body 160, or against the information relating to the absolute positional and the absolute orientation in the environment of the imaging apparatus 150 and the measuring object body 160. Therefore, the position and orientation measuring apparatus according to the present exemplary embodiment can realize accurate and reliable position and orientation measurement However, observing the indices in the environment by using both the inside-out camera 450b and the imaging apparatus 150 is not essentially required. In other words, the indices in the environment can be observed by using either the inside-out camera 450b or the imaging apparatus 150. Thus, as a simple arrangement, the present exemplary embodiment can be modified to exclude the inside-out camera 450b.

Alternatively, the imaging apparatus 150 does not need to be used to observe the indices placed in the environment. Furthermore, the inside-out camera 450b can be used to observe the index (indices) on the measuring object body 160. In this case, the imaging apparatus 150 does not need to observe the index (indices) on the measuring object body 160. Furthermore, plural inside-out cameras can be mounted on the imaging apparatus 150, so that one inside-out camera can observe the index (indices) on the measuring object body 160 and another inside-out camera can observe the index (indices) in the environment.

Other Exemplary Embodiments

Modified Example 1

Each of the above-described exemplary embodiments calculates the correction value $\Delta s$ based on the deviation vector U and the matrix $\Theta$ according to the Newton-Raphson method defined by the equation (14). However, the correction value $\Delta s$ can be calculated without relying on the Newton-Raphson method. For example, the correction value $\Delta s$ can be obtained by using the LM method (Levenberg-Marquardt method) that can obtain iterative solutions of nonlinear equations, by combining a statistical technique such as an M estimation (i.e., well-known robust estimation), or by applying any other numerical calculation method.

Furthermore, it is possible to define a state vector of a Kalman filter that includes the unknown parameter "s" in the above-described exemplary embodiments. By utilizing the observation equation defined by the equation (2), the equation (5), or the equation (8), and further by using a prediction model of uniform acceleration or the like, it is possible to constitute an extended Kalman filter or an iterative extended Kalman filter that can bring the effect of simultaneously updating the position and the orientation of respective measuring objects without causing any contradiction against the information relating to a relative position and a relative orientation between respective measuring objects and also against the information relating to an absolute position and an absolute orientation between respective measuring objects.

The extended Kalman filter and the iterative extended Kalman filter are, for example, discussed in J. Park, B. Jiang, and U. Neumann: "Vision-based pose computation: robust and accurate augmented reality tracking," Proc. 2nd International Workshop on Augmented Reality (IWAR'99), pp. 3-12, 1999.

Furthermore, in step 3010 and step 5020 of the above-described exemplary embodiments, the initial values of the unknown parameters are obtained from previous calculation results. However, the initial values can be obtained in various ways.

For example, in the first or second exemplary embodiment, the initial values can be position and orientation data of respective measuring objects if the outside-in camera can obtain the information relating to the indices on the measuring object according to any known technique. In the third exemplary embodiment, the initial values can be position and orientation data of respective measuring objects if respective inside-out cameras can obtain the information relating to the indices according to any known technique.

Furthermore, the above-described second or third exemplary embodiment obtains the unknown parameters according to the iterative solutions in the steps 5030 through 5080. However, the unknown parameters can be obtained by using other methods.

In the second and third exemplary embodiments, the unknown parameters are position information. In such a case, linear equations for the unknown parameters can be obtained by developing respective observation equations. The unknown parameters can be obtained by solving linear simultaneous equations with inputs of image coordinates of detected indices and three-dimensional coordinates.

Modified Example 2

In the above-described second and third exemplary embodiments, the orientation sensor 470 is mounted on each of the measuring objects (i.e., on the imaging apparatus 150 and the measuring object body 160). However, the orientation sensor can be omitted. Even when no information is available from the orientation sensor 470, positions and orientations of respective measuring objects can be calculated based on the image information if 12 unknown parameters are used (refer to the first exemplary embodiment).

In this case, the parameters relating to the orientation in respective observation equations are regarded as unknown values. For example, $R_{WO2}$ and $R_{WO1}$ of the equations (16) and (17), if unobtainable from the orientation sensor, can be replaced with $R(\omega_{WO2})$ and $R(\omega_{WO1})$ that include unknown values $\omega_{WO2}$ and $\omega_{WO1}$. Similarly, $R_{WO}$ and $R_{WC}$ of the equations (18), (19), and (20), if unobtainable from the orientation sensor, can be replaced with $R(\omega_{WO})$ and $R(\omega_{WC})$ that include unknown values $\omega_{WO}$ and $\omega_{WC}$.

In the above-described first exemplary embodiment, orientation sensors can be mounted on respective measuring objects so that unknown parameters can be reduced to the position information of respective measuring objects. In this case, similar to the third exemplary embodiment, the orientation sensors can obtain the orientation $R_{WO}$ of the measuring object body 160 and the orientation $R_{WC}$ of the imaging apparatus 150. In the equations (3), (6), and (9), $R(\omega_{WO})$ and $R(\omega_{WC})$ can be replaced with the values $R_{WO}$ and $R_{WC}$ measured by the orientation sensors.

Furthermore, if a sufficient number of orientation sensors are available, only reliable parameters can be used as fixed values. In general, orientation sensors are not reliable in the accuracy of measurement values around the vertical gravity axis (i.e., azimuth angles). Thus, the orientation sensors can be used only for obtaining inclined angles (inclination) as fixed values. In other words, the 3-axis orientation sensors of the exemplary embodiments can be replaced with inclination sensors. Furthermore, the orientation sensors can be used only for obtaining initial orientation values, if all position and orientation parameters are obtainable as unknown values.

Furthermore, any sensors other than the orientation sensors (e.g., 6 degree-of-freedom position and orientation sensors or position sensors) can be mounted on measuring objects. At least part of the measurement values obtained by these sensors can be used as fixed parameters. The measurement values obtained by these sensors can be used as initial values. Furthermore, these sensors do not need to be mounted on all measuring object bodies.

Modified Example 3

In the above-described exemplary embodiments, each index is defined by point coordinates. However, the indices of the above-described exemplary embodiments can be replaced with other indices. For example, indices having linear features (hereinafter, referred to as "linear indices") can be used as disclosed in conventional position and orientation measuring apparatuses (e.g., refer to D. G. Lowe: "Fitting parameterized three-dimensional models to images," IEEE Transactions on PAMI, vol. 13, no. 5, pp. 441-450, 1991).

For example, a deviation vector U can be determined based on the deviation calculated from detection values obtained from an image and estimated values of the state vector "s", as a criteria used for evaluating the distance from the origin to the linear index. The matrix E can be determined by a Jacobian matrix with 1 row×12 columns (or 1 row×6 columns) whose elements are solutions obtained when partial differentiation is applied to the observation equation with respect to each element of the state vector "s." Similar to the above-described exemplary embodiments, the measurement (correction) of position and orientation can be performed.

Furthermore, deviations and image Jacobians can be integrated if obtained from linear indices, point indices, and other indices, so that the features of these indices can be used together. For example, in the third exemplary embodiment, linear features such as the contours of rectangular objects can be used as indices on the measuring object body 160 and markers can be provided as indices in the environment.

Modified Example 4

The position and orientation measuring apparatus according to the first exemplary embodiment does not have a component equivalent to the inside-out camera 450 disclosed in the second exemplary embodiment. However, similarly to the second exemplary embodiment, the first exemplary embodiment can be modified to further include the inside-out camera 450 on the measuring object body 160 so that the inside-out camera 450 can observe the index (indices) on the imaging apparatus 150. The information obtained from the inside-out camera 450 can be used to calculate positions and orientations of the imaging apparatus 150 and the measuring object body 160.

In this case, the image input section 110 inputs an image taken by the inside-out camera 450. The index detecting section 120 detects the coordinates. Similar to the second exemplary embodiment, the observation equations (equations (17) and (4)) can be incorporated in the calculating steps of the solutions performed by the position and orientation calculating section 130. Similarly, the first exemplary embodiment can be modified to further include the inside-out camera 450 on the imaging apparatus 150. In this case, observation of index (indices) by the imaging apparatus 150 is not required.

Furthermore, the position and orientation measuring apparatus according to the first and second exemplary embodiments do not use the index (indices) placed in such an environment used in the third exemplary embodiment. On the other hand, the position and orientation measuring apparatus according to the third exemplary embodiment does not depend on the outside-in camera used in the first and second exemplary embodiments. However, it is possible to use both of the information relating to the index (indices) on the measuring objects (i.e., the imaging apparatus 150 and the measuring object body 160) obtained from the outside-in camera, and the information relating to the index (indices) placed in the environment obtained from the inside-out camera (i.e., the imaging apparatus 150 and the inside-out camera 450).

More specifically, the first and second exemplary embodiments can be modified to provide the index (indices) in the environment so that positions and orientations of the imaging apparatus 150 and the measuring object body 160 can be calculated based on the information relating to these index (indices) obtained from the imaging apparatus 150 and inside-out camera 450. In this case, similar to the third exemplary embodiment, the observation equations (the equations (18) to (20) and the equation (4)) are incorporated in the calculating steps of the position and orientation calculating section 130 or 430.

Furthermore, only one measuring object body can be used for the observation of the index (indices) in the environment by the inside-out camera and the observation of the index (indices) on the object body by the outside-in camera.

If a first measuring object body does not mount the inside-out camera that can observe the index (indices) placed in the environment and no index (indices) are provided on a second measuring object body, the outside-in camera can observe the index (indices) on the first measuring object body and the inside-out camera mounted on the second measuring object body can observe the index (indices) placed in the environment. Any other combinations or modifications can be employed within the scope of the present invention.

Modified Example 5

The position and orientation measuring apparatus according to the above-described exemplary embodiments uses two measuring objects. However, the total number of the bodies to be measured is not limited to two. For example, in the first exemplary embodiment, if one imaging apparatus and plural measuring object bodies are measured, an appropriate number of indices can be provided on respective measuring object bodies, so that the imaging apparatus 150 and the outside-in camera 140 can observe these indices and the position and orientation of respective object bodies can be solved as unknown parameters. Similarly, the second and third exemplary embodiments can be modified to add the inside-out cameras and the orientation sensors if desirable.

According to the present invention, program code (software) realizing the functions of the above-described exemplary embodiments can be supplied, via an appropriate recording medium, to a system or an apparatus. A computer (e.g., CPU or micro-processing unit (MPU)) of the system or apparatus can read and execute the program code from the recording medium. In this case, the program code read out of the recording medium can realize the functions of the above-described exemplary embodiments.

Furthermore, realizing the functions of the above-described exemplary embodiments is not limited to executing the program code read by the computer. The operating system (OS) running on the computer can execute part of all of the actual processing based on instructions of the program code, to realize the functions of the above-described exemplary embodiments.

Furthermore, the program code read out of a recording medium can be written into a memory of a function expansion board equipped in a computer or into a memory of a function expansion unit connected to the computer. In this case, based on instructions of the program code, the CPU provided on the function expansion board or the function expansion unit can execute part or all of the processing so that the functions of the above-described exemplary embodiments can be realized.

When the present invention is applied to the above-described recording medium, the recording medium stores program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-138468 filed May 11, 2005, which is hereby incorporated by reference herein in its entirety.

What is claimed is:

1. A position and orientation measuring method for measuring a position and an orientation of a first imaging apparatus and a position and an orientation of at least one object body observed by the first imaging apparatus, the position and orientation measuring method comprising:
   (a) detecting an index provided on the observed object body, based on a first image obtained from the first imaging apparatus;
   (b) detecting an index provided on the observed object body, based on a second image obtained from a second imaging apparatus;
   (c) detecting an index provided on the first imaging apparatus, based on the second image; and
   (d) contemporaneously calculating a position and an orientation of the first imaging apparatus and a position and an orientation of the observed object body, based on information relating to image coordinates of the indices detected in (a), (b) and (c).

2. The position and orientation measuring method according to claim 1, wherein (d) includes correcting estimated values of position and orientation parameters representing respective measuring object bodies, based on a deviation between the information relating to image coordinates of indices detected in (a), (b) and (c) and a calculation value of the information relating to the image coordinates obtained by using estimated values of position and orientation parameters of respective measuring object bodies.

3. The position and orientation measuring method according to claim 2, wherein (d) includes performing processing for calculating correction values to correct the estimated values, simultaneously for each of the measuring object bodies.

4. The position and orientation measuring method according to claim 1, further comprising:
   (e) inputting a position and/or orientation measurement value from a sensor that measures the position and/or orientation of at least one measuring object body,
   wherein (d) includes calculating the position and the orientation of respective measuring object bodies based on the position and/or orientation measurement value of the measuring object body entered in (e) in addition to the information relating to image coordinates of the indices detected in (a), (b) and (c).

5. The position and orientation measuring method according to claim 4, wherein (d) includes calculating remaining position and orientation parameters of respective measuring object bodies based on the information relating to the image coordinates of the indices detected in (a), (b) and (c) by using, as known value, at least one of position and/or orientation measurement values of at least one measuring object body entered in (e).

6. A position and orientation measuring method for measuring positions and orientations of plural measuring object bodies or measuring a relative position and a relative orientation between the measuring object bodies, the position and orientation measuring method comprising:
   (a) observing and detecting indices provided on other measuring object bodies, based on an image obtained from a first imaging apparatus mounted on at least one of the measuring object bodies;
   (b) observing and detecting indices provided on respective measuring object bodies, based on an image obtained from a second imaging apparatus provided in an environment; and
   (c) calculating positions and orientations of respective measuring object bodies or calculating a relative position and a relative orientation between the measuring object bodies, based on information relating to image coordinates of the indices detected in (a) and (b).

7. A position and orientation measuring method for measuring positions and orientations of plural measuring object bodies or measuring a relative position and a relative orientation between the measuring object bodies, the position and orientation measuring method comprising:
   (a) observing and detecting indices provided in other measuring object bodies, based on an image obtained from a first imaging apparatus mounted on at least one of the measuring object bodies;
   (b) observing and detecting indices provided in an environment, based on an image obtained from a second imaging apparatus provided on each of the measuring object bodies; and
   (c) calculating positions and orientations of respective measuring object bodies or calculating a relative position and a relative orientation between the measuring object bodies, based on information relating to image coordinates of the indices detected in (a) and (b).

8. A position and orientation measuring apparatus configured to measure a position and an orientation of a first imaging apparatus and a position and an orientation of at least one object body observed by the first imaging apparatus, the position and orientation measuring apparatus comprising:
   a first index detecting unit configured to detect an index provided on the observed object body, based on a first image obtained from the first imaging apparatus;
   a second index detecting unit configured to detect an index provided on the observed object body, based on a second image obtained from a second imaging apparatus;
   a third index detecting unit configured to detect an index provided on the first imaging apparatus, based on the second image; and
   a position and orientation calculating unit configured to contemporaneously calculate a position and an orientation of the first imaging apparatus and a position and an orientation of the observed object body, based on information relating to image coordinates of the indices detected by the first index detecting unit, the second index detecting unit, and the third index detecting unit.

9. The position and orientation measuring apparatus according to claim 8, wherein the second imaging apparatus is located in a physical space independently from the first imaging apparatus.

10. The position and orientation measuring apparatus according to claim 8, wherein the second imaging apparatus is mounted on the observed object body.

11. A position and orientation measuring apparatus configured to measure a position and an orientation of a first imaging apparatus and a position and an orientation of an object body observed by the first imaging apparatus, the position and orientation measuring apparatus comprising:
- a first index detecting unit configured to detect an index provided on the observed object body, based on a first image obtained from the first imaging apparatus;
- a second index detecting unit configured to detect an index provided in an environment, based on a second image obtained from a second imaging apparatus mounted on the observed object body;
- a third index detecting unit configured to detect an index provided in the environment, based on the first image or from a third image obtained from a third imaging apparatus mounted on the first imaging apparatus; and
- a position and orientation calculating unit configured to calculate a position and an orientation of the first imaging apparatus and a position and an orientation of the observed object body, based on information relating to image coordinates of the indices detected by the first index detecting unit, the second index detecting unit, and the third index detecting units.

12. A computer-readable medium having stored thereon a control program readable by a computer that executes processing for measuring a position and an orientation of a first imaging apparatus and a position and an orientation of at least one object body observed by the first imaging apparatus, the control program stored on the computer-readable medium including computer-executable instructions comprising:
- (a) detecting an index provided on the observed object body, based on a first image obtained from the first imaging apparatus;
- (b) detecting an index provided on the observed object body, based on a second image obtained from a second imaging apparatus;
- (c) detecting an index provided on the first imaging apparatus, based on the second image; and
- (d) contemporaneously calculating a position and an orientation of the first imaging apparatus and a position and an orientation of the observed object body, based on information relating to image coordinates of the indices detected in (a), (b) and (c).

* * * * *